United States Patent
Skillman et al.

(10) Patent No.: US 9,920,217 B2
(45) Date of Patent: Mar. 20, 2018

(54) POLYMER PARTICLES AND COATING COMPOSITIONS FORMULATED FROM THE POLYMER PARTICLES

(75) Inventors: Charles Skillman, Zelienople, PA (US); Jeffrey Niederst, Leechburg, PA (US); Grant Schutte, Pittsburgh, PA (US)

(73) Assignee: SWIMC, LLC, Cleveland, OH (US)

( * ) Notice: Subject to any disclaimer, the term of this patent is extended or adjusted under 35 U.S.C. 154(b) by 0 days.

(21) Appl. No.: 13/389,943

(22) PCT Filed: Aug. 11, 2010

(86) PCT No.: PCT/US2010/045202
§ 371 (c)(1),
(2), (4) Date: Jun. 29, 2012

(87) PCT Pub. No.: WO2011/019840
PCT Pub. Date: Feb. 17, 2011

(65) Prior Publication Data
US 2012/0270983 A1 Oct. 25, 2012

Related U.S. Application Data

(60) Provisional application No. 61/233,004, filed on Aug. 11, 2009.

(51) Int. Cl.
*C09D 167/02* (2006.01)
*C08J 3/14* (2006.01)
*C09D 7/00* (2018.01)

(52) U.S. Cl.
CPC .............. *C09D 167/02* (2013.01); *C08J 3/14* (2013.01); *C09D 7/001* (2013.01)

(58) Field of Classification Search
CPC ........... C09D 7/001; C09D 167/02; C08J 3/14
See application file for complete search history.

(56) References Cited

U.S. PATENT DOCUMENTS

| | | | |
|---|---|---|---|
| 4,054,681 A | 10/1977 | Bruning et al. | |
| 4,340,519 A * | 7/1982 | Kotera et al. | 523/414 |
| 4,401,787 A | 8/1983 | Chen | |
| 5,010,132 A | 4/1991 | Morinaga et al. | |
| 5,198,471 A | 3/1993 | Nauman et al. | |
| 5,242,994 A * | 9/1993 | Nield et al. | 525/438 |
| 5,258,471 A * | 11/1993 | Nield et al. | 525/438 |
| 5,278,282 A | 1/1994 | Nauman et al. | |
| 5,314,751 A | 5/1994 | Nield et al. | |
| 5,464,884 A * | 11/1995 | Nield et al. | 523/400 |
| 5,736,621 A * | 4/1998 | Simon et al. | 528/271 |
| 5,853,926 A | 12/1998 | Bohan et al. | |
| 5,916,979 A * | 6/1999 | Koegler et al. | 524/308 |
| 6,150,021 A * | 11/2000 | Blatter et al. | 428/402 |
| 6,365,315 B1 | 4/2002 | Wulf et al. | |
| 6,512,025 B2 | 1/2003 | Choudhery | |
| 6,616,869 B2 * | 9/2003 | Mathiowitz et al. | 264/4 |
| 7,081,489 B2 * | 7/2006 | Chen et al. | 523/200 |
| 2004/0068055 A1* | 4/2004 | Share et al. | 525/216 |
| 2005/0181155 A1* | 8/2005 | Share et al. | 428/35.7 |
| 2007/0126159 A1* | 6/2007 | Simon et al. | 264/497 |
| 2012/0270983 A1* | 10/2012 | Skillman et al. | 524/360 |

FOREIGN PATENT DOCUMENTS

| | | | |
|---|---|---|---|
| EP | 0466310 A1 | | 1/1992 |
| JP | 2004-292467 | * | 10/2004 |
| WO | 2010055019 A1 | | 5/2010 |

OTHER PUBLICATIONS

English machine translation of JP 2004-292467 to Hayashi obtained on Dec. 27, 2013 from AIPN/JPO.*
"O-Chlorophenol". Obtained from http://www.chemicalland21.com/industrialchem/organic/o-CHLOROPHENOL.htm on Dec. 27, 2013.*
International Search Report and Written Opinion for corresponding international application No. PCT/US2010/045202 (11 pages).
Lauzier, et. al., Film formation and paper coating with poly (β-hydroxyalkanoate), a biodegradable latex, Tappi Journal, May 1993, pp. 71-77, vol. 76, No. 5, Norcross, Ga., US (7 pages).
Tapriyal, D., et al., "Micronization of PET via Freezing of Highly Sheared Emulsions in Saturated THF," 9th ISSF Conference, May 2009, Bordeaux, France (24 pages).
Tapriyal, D., et al., "Micronization of PET via Freezing of Highly Sheared Emulsions in Compressed THF," AIChE Meeting, Salt Lake City, Utah, Nov. 5, 2007 (24 pages).
Enick, Robert M., et al., "Bulk Micronization of Pet Using Compressed Liquid Thf," Monday, Nov. 5, 2007, downloaded from http://aiche.confex.com/2007/techprogram/P95319.HTM on Jan. 23, 2009 (1 page).

* cited by examiner

*Primary Examiner* — Michael A Salvitti
(74) *Attorney, Agent, or Firm* — Merchant & Gould P.C.

(57) ABSTRACT

The invention provides polymer particles useful in a variety of applications, including coating applications such as packaging coatings. The polymer particles preferably have a volume-averaged particle size of less than 40 microns, more preferably less than 20 microns. In preferred embodiments, the polymer particles are precipitated particles, more preferably precipitated polyester particles, which are optionally free of low-molecular weight surfactant.

21 Claims, No Drawings

POLYMER PARTICLES AND COATING COMPOSITIONS FORMULATED FROM THE POLYMER PARTICLES

CROSS REFERENCE TO RELATED APPLICATION

This application is the National Stage filing under 35 U.S.C. 371 of International Application No. PCT/US2010/045202 filed on Aug. 11, 2010 and entitled "Polymer Particles and Coating Compositions Formulated from the Polymer Particles," which claims priority to U.S. Provisional Application Ser. No. 61/233,004 filed on Aug. 11, 2009 and entitled "Polymer Particles and Coating Compositions Formulated from the Polymer Particles," each of which is incorporated herein by reference in its entirety.

TECHNICAL FIELD

This invention relates to polymer particles and coating compositions formulated from polymer particles.

BACKGROUND

A wide variety of coatings have been used to coat the surfaces of packaging articles (e.g., food and beverage cans). For example, metal cans are sometimes coated using "coil coating" or "sheet coating" operations, i.e., a planar coil or sheet of a suitable substrate (e.g., steel or aluminum metal) is coated with a suitable composition and hardened (e.g., cured). The coated substrate then is formed into the can end or body. Alternatively, liquid coating compositions may be applied (e.g., by spraying, dipping, rolling, etc.) to the formed article and then hardened (e.g., cured).

Packaging coatings should preferably be capable of high-speed application to the substrate and provide the necessary properties when hardened to perform in this demanding end use. For example, the coating should preferably be safe for food contact, not adversely affect the taste of the packaged food or beverage product, have excellent adhesion to the substrate, resist staining and other coating defects such as "popping," "blushing" and/or "blistering," and resist degradation over long periods of time, even when exposed to harsh environments. In addition, the coating should generally be capable of maintaining suitable film integrity during container fabrication and be capable of withstanding the processing conditions that the container may be subjected to during product packaging.

Various coatings have been used as interior protective can coatings, including epoxy-based coatings and polyvinyl-chloride-based coatings. Each of these coating types, however, has potential shortcomings. For example, the recycling of materials containing polyvinyl chloride or related halide-containing vinyl polymers can be problematic. There is also a desire by some to reduce or eliminate certain epoxy compounds commonly used to formulate food-contact epoxy coatings.

What is needed in the marketplace is an improved binder system for use in coatings such as, for example, packaging coatings.

SUMMARY

In one embodiment, the present invention provides polymer particles that are preferably useful as a film-forming component of a coating composition. Preferred polymer particles have a particle size of less than 40 microns, more preferably less than 20 microns, even more preferably less than 10 microns. Precipitated polymer particles are presently preferred, with precipitated polyester particles being particularly preferred.

In another embodiment, the present invention provides a method for making the polymer particles described herein. The method preferably includes the step of providing a mixture including: (i) a solid polymer material preferably having a number average molecular weight of at least 10,000 and (ii) an organic solvent preferably having a boiling point of at least 120° C. The mixture is heated to a suitable temperature to dissolve at least some of the solid polymer material in the organic solvent, which in some embodiments is accomplished at atmospheric pressure. When a desired amount of the solid polymer has dissolved, the mixture is suitably cooled to form precipitated polymer particles, which preferably have a volume-averaged particle size of less than 20 microns, more preferably less than 10 microns. In a preferred embodiment, the precipitated polymer particles are formed without using any surfactant, and especially any low-molecular-weight surfactant that could potentially migrate out of a coating including the precipitated polymer particles.

In yet another embodiment, the present invention provides a coating composition that preferably includes the polymer particles described herein, preferably in at least a film-forming amount. The coating composition may further include a liquid carrier (e.g., an organic solvent) and/or a crosslinker. Preferably, the polymer particles of the coating composition have a volume-averaged particle size of less than 40 microns, more preferably less than 20 microns. In one embodiment, the polymer particles, and preferably the coating composition including the polymer particles, are at least substantially free of mobile and/or bound surfactant.

In yet another embodiment, the present invention provides an article that is coated on at least a portion of a surface with a coating composition described herein. The article may be, for example, a packaging article such as a food or beverage can. The coating composition may be used on food-contact surfaces (e.g., interior surfaces of a food or beverage can).

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and the claims.

SELECTED DEFINITIONS

Unless otherwise specified, the following terms as used herein have the meanings provided below.

The term "substantially free" of a particular mobile compound means that the compositions of the present invention contain less than 1,000 parts per million (ppm) of the recited mobile compound. The term "essentially free" of a particular mobile compound means that the compositions of the present invention contain less than 100 parts per million (ppm) of the recited mobile compound. The term "essentially completely free" of a particular mobile compound means that the compositions of the present invention contain less than 10 parts per million (ppm) of the recited mobile compound. The term "completely free" of a particular mobile compound means that the compositions of the present invention contain less than 20 parts per billion (ppb) of the recited mobile compound.

The term "mobile" means that the compound can be extracted from the cured coating when a coating (typically ~1 mg/cm$^2$ (6.5 mg/in$^2$) thick) is exposed to a test medium for some defined set of conditions, depending on the end use. An example of these testing conditions is exposure of the cured coating to HPLC-grade acetonitrile for 24 hours at 25° C.

If the aforementioned phrases are used without the term "mobile" (e.g., "substantially free of XYZ compound") then the compositions of the present invention contain less than the aforementioned amount of the compound whether the compound is mobile in the coating or bound to a constituent of the coating.

The term "food-contact surface" refers to a surface of an article (e.g., a food or beverage container) intended for prolonged contact with food product. When used, for example, in the context of a metal substrate of a food or beverage can, the term generally refers to an interior metal surface of the can that would be expected to contact food product in the absence of coating composition applied thereon. By way of example, a base layer, intermediate layer, and/or polymer top-coat layer applied on an interior surface of a metal food or beverage can is considered to be applied on a food-contact surface of the can.

The term "crosslinker" refers to a molecule capable of forming a covalent linkage between polymers or between two different regions of the same polymer.

The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is crosslinked and does not "melt."

The terms "dissolve" or "dissolved," when used in the context of a polymer material that is dissolved in a liquid carrier, refers to a polymer material that is macroscopically dispersed in the carrier. By way of example, a polymer material that is sufficiently dispersed in a liquid carrier such that the carrier appears substantially clear to the unaided human eye is considered to be dissolved in the carrier. A preferred embodiment of a dissolved polymer material is a polymer material that is uniformly dispersed at the molecular or ionic level in the liquid carrier (e.g., so as to form a "true" solution).

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers). Similarly, unless otherwise indicated, the use of a term designating a polymer class such as, for example, "polyester" is intended to include both homopolymers (e.g., PET) and copolymers (e.g., copolyesters such as PET/I).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present invention provides polymer particles that are useful in preferred embodiments as a binder component of a coating composition. In some embodiments, the present invention provides a coating composition that includes at least a film-forming amount of the polymer particles and an optional liquid carrier, which in presently preferred embodiments is an organic-solvent-based liquid carrier.

Each polymer particle may be formed from a single type of polymer material or may include two or more different types of polymer materials. In addition, if desired, the polymer particles may incorporate one or more non-polymer materials such as, for example, a non-polymer pigment or filler. The polymer particles preferably include one or more thermoplastic polymers, although it is contemplated that the polymer particles may be based on one or more thermoset polymers or a combination of thermoset and thermoplastic polymers. The polymer particles preferably include less than 1 weight percent ("wt-%") of vinyl chloride materials (e.g., polyvinyl chloride—PVC) or other halogenated vinyl polymers, more preferably the polymer particles are completely free of such materials.

The polymer particles may be precipitated polymer particles, polymer particles formed by methods other than precipitation, or a combination of precipitated and non-precipitated polymer particles. Any suitable method may be used to form suitably sized precipitated particles of the present invention. In preferred embodiments, the method includes providing a carrier (e.g., a solvent) having polymer material dispersed therein, preferably dissolved therein, and reducing the solubility of the polymer material in the carrier (e.g., by cooling the temperature of the carrier, by changing the composition of the carrier, or by changing the concentration of the polymer in the carrier) to form precipitated particles. Latex polymer particles formed, for example, via emulsion polymerization techniques are not typically precipitated particles.

Polymer particles of the invention may be of any suitable shape, including, for example, flake, sheet, rod, globular, or spherical (or essentially spherical). Precipitated polymer particles of the invention are preferably spherical, or essentially spherical.

Preferred polymer particles of the invention have a size that is less than the desired coating thickness of the liquid coating composition when applied to a substrate.

Laser diffraction may be used to determine the particle size of polymer particles of the present invention. Preferred polymer particles described herein having a volume-averaged particle size of less than 40 microns, more preferably less than 20 microns, and even more preferably less than 10 microns. In some embodiments, the volume-averaged particle size is greater than 0.5 microns, more preferably greater than 1 or 3 microns. Care should be exercised in interpreting volume-averaged particle sizes since some methods tend to more heavily weight larger particles. A suitable method for determining volume-averaged particle size is described below in the Test Methods section.

It is contemplated that coating compositions of the invention may include polymer particles having particle sizes outside the particle size parameters described above. In some embodiments, the inclusion of such "larger" or "smaller" polymer particles in the liquid coating composition may cause the total population of polymer particles in the liquid coating composition to exhibit a volume-averaged particle size outside the particle size parameters described above. (This may occur, for example, if the coating composition is formulated using a sample of polymer particles of the present invention combined with a sample of other larger polymer particles.) Preferably, that the total amount of such optional "larger" and/or "smaller" polymer particles included in the liquid coating composition is sufficiently low so that the desired properties of the liquid and/or cured coating composition are substantially preserved (e.g., the desired viscosity and/or application properties of the liquid coating composition; the desired adhesion, flexibility, chemical resistance, coating aesthetics, etc., of the cured coating).

In such embodiments, preferably a substantial majority, by volume %, (e.g., 65% or more, 80% or more, 90% or more, 95% or more, 99% or more, etc.) of the total particles present in the liquid coating composition exhibit a volume-averaged particle size pursuant to the particle size parameters described above. In some embodiments, one or both of the volume-averaged particle size and the number-averaged particle size of a substantial majority, or even all, of the polymer particles present in the liquid coating composition are less than 20 microns, or less than 10 microns.

In preferred embodiments, the polymer particles include a polymer material having a melting point of at least about 40° C., more preferably at least about 80° C., and even more preferably at least about 120° C. The polymer material preferably has a melting point of less than about 260° C., more preferably less than about 220° C., and even more preferably less than about 200° C. In particularly preferred embodiments, substantially all of the polymer material of the polymer particles exhibits a melting point pursuant to that described above.

Preferably, the polymer material is a crystallizable polymer (e.g., under a reasonable set of conditions at least a minimal % crystallinity in the polymer can be achieved in about 48 hours or less). In preferred coating compositions of the invention, at least one polymer material of the polymer particles (and more preferably substantially all, or all, of the polymer material present in the polymer particles) is at least semi-crystalline (e.g., semi-crystalline or crystalline). In some embodiments, the polymer particles may include amorphous polymer material or a blend of at least semi-crystalline polymer material and amorphous polymer material.

In presently preferred embodiments, the polymer particles include one or more polyester polymers, more preferably one or more crystallizable polyester polymers, and even more preferably one or more at least semi-crystalline polyester polymers. In a particularly preferred embodiment, the polymer particles are precipitated polyester particles, more preferably precipitated polyester particles including at least one semi-crystalline polyester polymer. In other embodiments, the polymer particles may be any suitable polymer particles, including, for example, acrylic particles, polyamide particles, polyurethane particles, and combinations thereof (with or without polyester particles). As previously discussed, the polymer materials may be thermoplastic polymer materials, thermoset polymer materials, or a combination thereof. In some embodiments, the polymer particles may be formed using a mixture of suitable polymer materials.

The molecular weight of the polymer material of the polymer particles is preferably sufficiently large so that the particles do not appreciably swell or dissolve in the liquid carrier medium of the coating composition (e.g., under ambient conditions). As discussed above, in presently preferred embodiments, the polymer particles are polyester particles. Such polyester particles are preferably composed of a polyester polymer that has a number average molecular weight ("Mn") of greater than about 5,000, more preferably greater than about 10,000, and even more preferably greater than about 15,000. In some embodiments, the polyester particles have an Mn of less than about 45,000, more preferably less than about 35,000, and even more preferably less than about 25,000. Suitable molecular weight ranges for polymer materials other than polyester materials (e.g., acrylic, polyamide, polyurethane, etc.) will typically be as described above for polyester materials, although deviations therefrom may be desirable in certain embodiments.

While not intending to be bound by any theory, it is believed that if too much of the polymer material of the polymer particles dissolves in the liquid carrier (i.e., goes into solution), then the viscosity of the coating composition may become unsuitably high for certain coating applications. Therefore, the polymer particles of the invention are preferably insoluble, or at least substantially insoluble, in the liquid carrier of the coating composition at ambient conditions (e.g., 25° C. and 1 atmosphere of pressure) and normal mixing and/or storage times. Preferred polymer particles have a solubility of less than 5% in the liquid carrier medium at 100° F. (37.8° C.). In one embodiment, precipitated polyester particles of the invention exhibit a solubility of about 1% in the liquid carrier medium.

Any suitable polyester material may be used that is capable of forming suitably sized particles that are preferably insoluble, or at least substantially insoluble, in the liquid carrier medium under ambient conditions and normal mixing and/or storage times. Suitable polyesters include polyesters formed from one or more suitable polycarboxylic acid components (e.g., dicarboxylic acid components, tricarboxylic acid components, tetracarboxylic acid components, etc.) and one or more suitable polyol components (e.g., diol components, triol components, polyols having four hydroxyl groups, etc.). One or more other comonomers may optionally be used, if desired. Dicarboxylic acid components and diol components are preferred in certain embodiments.

Suitable dicarboxylic acid components include, for example, aromatic dicarboxylic acids such as terephthalic acid, isophthalic acid, phthalic acid and naphthalenedicarboxylic acid; and aliphatic dicarboxylic acids such as adipic acid, cyclohexane dicarboxylic acid, sebacic acid and azelaic acid; and mixtures thereof. Examples of other suitable polycarboxylic acids include benzene-pentacarboxylic acid; mellitic acid; 1,3,5,7 napthaline-tetracarboxylic acid; 2,4,6 pyridine-tricarboxylic acid; pyromellitic acid; trimellitic acid; trimesic acid; 3,5,3',5'-biphenyltetracarboxylic acid; 3,5,3',5'-bipyridyltetracarboxylic acid; 3,5,3',5'-benzophenonetetracarboxylic acid; 1,3,6,8-acridinetetracarboxylic acid; 1,2,4,5-benzenetetracarboxylic acid; and mixtures thereof. Anhydrides or esters of the aforementioned acids and mixtures of such acids, anhydrides or esters may also be used.

Suitable diol components include, for example, polyethylene glycols represented by the formula HO—$(CH_2)_n$—OH (where n is about 2 to 10) such as ethylene glycol, propylene glycol, butanediol, hexanediol and decamethylene glycol; branched glycols represented by the formula HO—$CH_2$—$C(R_2)$—$CH_2$—OH (where R is an alkyl group having 1 to 4 carbon atoms) such as neopentyl glycol; diethylene glycol and triethylene glycol; diols having a cyclohexane ring such as cyclohexane dimethanol (CHDM); 2-methyl-1,3 propane diol; and mixtures thereof. Glycerol, trimethylol propane, and other suitable trifunctional or higher polyols may also be used alone or in combination with any other suitable polyol.

Suitable exemplary crystalline and semi-crystalline polymers include polyethylene terephthalate ("PET"), copolymers of PET such as PET/I (e.g., molar ratio of ethylene terephthalate/ethylene isophthalate is preferably at least about 65/35), polybutylene terephthalate ("PBT"), polyethylene naphthalate ("PEN"), poly-1,4-cyclohexylenedimethylene terephthalate, and copolymers and combinations thereof. In some embodiments, the polyester material may be formed from ingredients including dimer fatty acids. Non-limiting examples of useful commercially available polyester materials may include polyesters commercially available under the tradename DYNAPOL such as, for example, DYNAPOL P1500, DYNAPOL P1500 HV, DYNAPOL P1510, and DYNAPOL P1550 (each available from Hüls AG and based on monomers including terephthalic acid and/or isophthalic acid); and polyester materials commercially available under the tradename GRILTEX such as, for example, GRILTEX DD2267EG and GRILTEX D2310EG (each available from EMS-Chemie and based on monomers including terephthalic acid and/or isophthalic acid). DYNAPOL P1500 HV polyester is a presently preferred polyester material and has a melting point temperature of about 170° C., a glass transition temperature of about 20° C., and a number average molecular weight of approximately 20,000.

The polymer particles are preferably dispersed in a liquid carrier to form a coating composition useful in a variety of coating applications, including, for example packaging coatings. Such coating compositions may be either water-based or solvent-based coating compositions. Examples of suitable liquid carriers include one or more organic solvents, one or more aqueous liquids (e.g., water), or a mixture thereof. Preferred liquid carriers exhibit sufficient volatility to substantially evaporate from the coating composition during the curing process. The liquid carrier may be the same as, or different than, a liquid carrier used in forming the polymer particles.

Preferred coating compositions of the invention include at least about 10, more preferably at least about 20, and even more preferably at least about 35 wt-% of solids, based on the total weight of the coating composition. Preferably, the coating composition includes less than about 80, more preferably less than about 70, and even more preferably less than about 60 wt-% of solids, based on the total weight of the coating composition.

The amount of polymer particles included in the coating composition may vary depending upon a variety of considerations. In some embodiments, the coating composition includes at least 5 wt-%, more preferably at least 10 wt-%, even more preferably at least 15 wt-% of polymer particles (which are preferably polyester particles and even more preferably precipitated polyester particles), based on the total weight of the coating composition. The total amount of polymer particles included in the coating composition is not especially limited. The amount of polyester particles may be as high as 100 wt-% in embodiments that do not include any liquid carrier such as, for example, a powder coating composition. For coating composition embodiments that utilize a liquid carrier, the coating composition will typically include no more than about 50 or 60% by weight of polymer particles, and more typically less.

In preferred embodiments, the coating composition includes at least 20 wt-% of liquid carrier, more preferably at least 30 wt-% of liquid carrier, and even more preferably at least 40 wt-% of liquid carrier. As previously discussed, the liquid carrier can include one or more different liquids. In some embodiments the coating composition includes at least 20 or 30 wt-% of organic solvent.

In presently preferred embodiments, the liquid carrier is an organic-solvent-based carrier. Examples of such carriers include an organic solvent or organic solvent blend that may optionally contain some amount of water. Suitable organic solvents may include polar solvents such as ketones (e.g., cyclohexanone, methyl isobutyl ketone ("MIBK"), and diisobutyl ketone ("DIBK")), glycol ethers, alcohols, aliphatic hydrocarbons, aromatic hydrocarbons, or mixtures thereof. In a presently preferred embodiment, the liquid carrier is organic solvent that is free of water. In embodiments where the polymer particles are formed in an organic solvent or organic solvent blend, the organic solvent or organic solvent blend may be the same or different from that used to form the polymer particles.

In some embodiments, the coating composition is a solvent-based coating composition that preferably includes no more than a de minimus amount (e.g., 0 to 2 wt-%) of water. In other embodiments, the coating composition can include a substantial amount of water and can even be a water-based coating composition.

The coating composition preferably has an intrinsic viscosity at 80° F. (26.7° C.) of less than about 2,000 centipoises ("cps"), more preferably less than about 800 cps, and even more preferably less than about 375 cps.

In preferred embodiments, the coating composition of the invention is formulated using one or more curing agents, including, for example, one or more crosslinkers. The choice of a particular crosslinker typically depends on the particular product being formulated. When present, the concentration of one or more optional crosslinkers may vary depending upon the desired result. In some embodiments, the coating composition contains from about 0.01 wt-% to about 30 wt-%, more preferably from about 0.5 wt-% to about 25 wt-%, or even more preferably from about 3 wt-% to about 20 wt-% of one or more crosslinkers, by weight of nonvolatile material in the coating composition.

Any suitable crosslinker can be used. For example, phenolic crosslinkers (e.g., phenoplasts), amino crosslinkers (e.g., aminoplasts), blocked isocyanate crosslinkers, and combinations thereof, may be used.

Examples of suitable phenolic crosslinkers include the reaction products of aldehydes with phenols. Formaldehyde and acetaldehyde are preferred aldehydes. Examples of suitable phenols that can be employed include phenol, cresol, p-phenylphenol, p-tert-butylphenol, p-tert-amylphenol, cyclopentylphenol, cresylic acid, bisphenol A (not presently preferred), and combinations thereof. Examples of suitable commercially available phenolic compounds include the BAKELITE 6535LB, 6581 LB, and 6812LB products (each available from Hexion Specialty Chemicals GmbH); the DUREZ 33162 product (Durez Corporation, Addison, Tex.); the PHENODUR PR 285 55/IB/B and PR 897 products (each available from CYTEC Surface Specialties, Smyrna, Ga.); the SANTOLINK EP 560 product; and combinations thereof. Examples of suitable resole-type phenolic crosslinkers include the BAKELITE 6535LB product, the DUREZ 33162 product, the VARCUM 6470 product, and combinations thereof. Amino crosslinker resins (e.g., aminoplasts) are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, urea-formaldehyde-based resins, and mixtures thereof.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Suitable commercially available amino crosslinking resins include, for example, the following products: CYMEL 301, CYMEL 303, CYMEL 370, CYMEL 373, CYMEL 1125, CYMEL 1131, CYMEL 5010 and MAPRENAL MF 980 (all available from Cytec Industries Inc., West Patterson, N.J.), and URAMEX BF 892 (available from DSM, Netherlands).

Non-limiting examples of blocked isocyanate crosslinkers include aliphatic and/or cycloaliphatic blocked polyisocyanates such as hexamethylene diisocyanate (HDI), isophorone diisocyanate (IPDI), bis[4-isocyanatocyclohexyl]methane (TMXDI), tetramethylene-m-xylidene diisocyanate ($H_{12}$MDI), isopropenyldimethyl-benzylisocyanate (TMI) and dimers or trimers thereof. Suitable blocking agents include, for example, n-butanone oxime, c-caprolactam, diethyl malonate, and secondary amines Non-limiting examples of suitable commercially available blocked isocyanate crosslinker products include VESTANAT B 1358 A, VESTANAT EP B 1186 A, VESTANA EP B 1299 SV (all available from Degussa Corp., Marl, Germany); and DESMODUR VPLS 2078 and DESMODUR BL 3175 (available from Bayer A.G., Leverkusen, Germany). In some embodiments, blocked isocyanates may be used that have an Mn of at least about 300, more preferably at least about 650, and even more preferably at least about 1,000.

The coating composition may also include a catalyst to increase the rate of cure. If used, a catalyst is preferably present in an amount of from about 0.05 wt-% to about 3 wt-%, and more preferably from about 0.1 wt-% to about 1 wt-% of nonvolatile material. Examples of catalysts suitable for use in curing the one or more optional crosslinkers may include acid catalysts such as phosphoric acid, citric acid, dinonylnaphthalene disulfonic acid (DNNSA), dodecylbenzene disulfonic acid (DDBSA), p-toluene sulfonic acid (p-TSA), dinonylnaphthalene disulfonic acid (DNNDSA), phenyl acid phosphate (PAP), alkyl acid phosphate (AAP) and the like, and mixtures thereof. Examples of other suitable catalysts may include tertiary amines, certain metallic compounds (e.g., tin, zinc, bismuth, etc.), or mixtures thereof.

If desired, coating compositions of the invention may optionally include other additives that do not adversely affect the coating composition or a cured coating resulting therefrom. The optional additives are preferably at least substantially free of mobile and/or bound BPA and aromatic glycidyl ether compounds (e.g., BADGE, BFDGE and epoxy novalac compounds). Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are carriers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents, or combinations thereof. Each optional ingredient can be included in a sufficient amount to serve its intended purpose, but preferably not in such an amount to adversely affect a coating composition or a cured coating resulting therefrom.

If desired, one or more additives may be included within the polymer particles themselves.

Presently preferred polymer particles, especially those intended for food-contact application, are preferably formed without the use of any surfactant. Methods for forming polymer particles without the use of surfactant are described below.

Presently preferred polymer particles of the invention, as well as presently preferred coating compositions of the invention, are at least substantially free, more preferably essentially free, even more preferably essentially completely free, and optimally completely free of mobile and/or bound: (i) low-molecular-weight surfactant or (ii) surfactant, regardless of the molecular weight. It is contemplated that, in some embodiments, it may be desirable to use a high molecular-weight polymeric surfactant preferably having a number average molecular weight greater than 5,000.

Surfactants are typically low-molecular weight materials that have a number average molecular weight of less than 2,000, less than 1,000, or less than 500. Surfactants are often described as having one or more "head" groups and one or more "tail" groups, where the tail and head groups have different chemical affinities (e.g., one is hydrophilic and the other hydrophobic). Some examples of surfactants used in the polymer and/or coating industry (e.g., to reduce the interfacial tension between two phases) include ionic surfactants such as sodium dodecyl sulfate, sodium lauryl sulfate, and perfluorooctanoate; nonionic surfactants such as fatty alcohols (e.g., cetyl alcohol, stearyl alcohol, etc.), polyoxyethylene glycol octylphenol ethers (e.g., the TRITON X-100 surfactant from Dow), polyoxyethylene glycol alkyl ethers, polyoxypropylene glycol alkyl ethers; and surfactants used for emulsion polymerizations (which may encompass one or more of the above surfactants).

In some embodiments, the polymer particles and/or coating compositions of the invention are at least substantially free, more preferably completely free, of the surfactants described in U.S. Pat. No. 5,314,751. As described in U.S. Pat. No. 5,314,751, certain surfactants (referred to therein as a "stabiliser" or "dispersant") have an "anchor component" that associates or reacts with a polymer phase and a "solvated component" that is soluble in, or solvatable by, a non-aqueous liquid that is immiscible with the polymer phase. Examples of such anchor components include polar acrylate and methacrylate polymers, vinyl pyrrolidone polymers, acid groups, anhydride groups, and epoxy groups. Examples of such solvated components include a hydrocarbon chain or a polybutadiene chain.

Preferred polymer particles and/or coating compositions of the invention are preferably substantially free, more preferably essentially free, even more preferably essentially completely free, and optimally completely free of mobile bisphenol A (BPA) and aromatic glycidyl ether compounds (e.g., diglycidyl ethers of bisphenol (BADGE), diglycidyl ethers of bisphenol F (BFDGE), and epoxy novalacs). In certain preferred embodiments, the polymer particles and/or coating composition of the inventions are preferably substantially free, more preferably essentially free, even more preferably essentially completely free, and optimally completely free of bound BPA and aromatic glycidyl ether compounds (e.g., BADGE, BFDGE and epoxy novalacs).

In some embodiments, the polymer particles and/or coating composition is at least substantially "epoxy-free," more preferably "epoxy-free." The term "epoxy-free," when used herein in the context of a polymer, refers to a polymer that does not include any "epoxy backbone segments" (i.e., segments formed from reaction of an epoxy group and a group reactive with an epoxy group). Thus, for example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4'dihydroxy bisphenol, etc.) and a halohdyrin (e.g., epichlorohydrin) would not be considered epoxy-free. However, a vinyl polymer formed from vinyl monomers and/or oligomers that include an epoxy moiety (e.g., glycidyl methacrylate) would be considered epoxy-free because the vinyl polymer would be free of epoxy backbone segments.

The coating composition can be applied on a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating. In one embodiment, where the coating is used to coat metal sheets or coils, the coating can be applied by roll coating.

The coating composition can be applied on a substrate prior to, or after, forming the substrate into an article. In some embodiments, at least a portion of the substrate surface is coated with a layer of the coating composition of the invention, which is then cured before the substrate is formed into an article.

After applying the coating composition on a substrate, the composition can be cured using a variety of processes, including, for example, oven baking by either conventional or convectional methods, or any other method that provides an elevated temperature that preferably allows the polymer particles to fuse together and/or melt and coalesce. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions of the invention can be dried and cured in one step.

The curing process may be performed at any suitable temperature, including, for example, oven temperatures in the range of about 175° C. to about 235° C. If metal coil is the substrate to be coated, curing of the applied coating composition may be conducted, for example, by subjecting the coated metal to an oven temperature of about 210° C. to about 235° C. for a suitable time period (e.g., 15 to 30 seconds).

Cured coatings of the invention preferably adhere well to metal (e.g., steel, tin-free steel (TFS), tin plate, electrolytic tin plate (ETP), aluminum, etc.) and provide high levels of resistance to corrosion or degradation that may be caused by prolonged exposure to, for example, food or beverage products or other packaged products (e.g., medical products such as pharmaceutical products). The coatings may be applied to any suitable surface, including inside surfaces of containers, outside surfaces of containers, container ends, and combinations thereof.

The coating composition of the invention has utility in a multitude of applications. The coating composition of the invention may be applied, for example, as a monocoat direct to metal (or direct to pretreated metal), as a primer coat, as an intermediate coat, as a topcoat, or any combination thereof. Cured coatings of the invention are particularly well suited as adherent coatings for metal cans or containers, although many other types of packaging articles can be coated. Examples of such packaging articles include closures (including, e.g., internal surfaces of twist off caps for food and beverage containers); bottle crowns; two and three-piece cans (including, e.g., food and beverage containers); shallow drawn cans; deep drawn cans (including, e.g., multi-stage draw and redraw food cans); can ends (including, e.g., easy open can ends, riveted beer or beverage can ends, etc.); monobloc aerosol containers; and general industrial containers, cans, and can ends. The coating composition may also have utility in other applications such as lighting fixtures; architectural metal skins (e.g., gutter stock, window blinds, siding and window frames); interior or exterior steel building products; HVAC applications; agricultural metal products; industrial coating applications (e.g., appliance coatings) and the like.

In some applications, the polymer particles of the invention may be used for a purpose other than as a primary film-forming component. For example, it is contemplated that the polymer particles of the invention may have utility as a toughening additive.

Preferred coating compositions of the invention are particularly suited for use as a food-contact coating applied on an interior surface of food or beverage containers. Preferably, the cured coatings are retortable when employed in food and beverage container applications. Preferred cured coatings are capable of withstanding elevated temperature conditions frequently associated with retort processes or other food or beverage preservation or sterilization processes. Particularly preferred cured coatings exhibit enhanced resistance to such conditions while in contact with food or beverage products that exhibit one or more aggressive (or corrosive) chemical properties under such conditions.

The film thickness of cured coating compositions of the invention may vary depending upon the desired end use. For food or beverage can coatings, the dry coating film thickness will generally be from about 2 to about 10 microns in thickness, more typically from about 2 to about 8 microns. The thickness of the wet food or beverage can coatings prior to cure is typically from about 20 to 40 microns. Using coating thicknesses outside the above ranges is well within the scope of the present invention.

Suitably sized polymer particles of the invention may be formed using any suitable process. A non-limiting embodiment of one such process (referred to hereinafter as "Process A") is illustrated below.

Solid polymer material in the form of, for example, pellets and/or flakes is combined with suitable organic solvent(s). The mixture of organic solvent and solid polymer material is then preferably heated to a temperature sufficient to dissolve the polymer material in the organic solvent, but preferably not so high as to melt or unsuitably degrade the polymer material. In preferred embodiments, a homogenous solution of dissolved polymer is formed that is typically clear in appearance to the human eye. Whether all of the solid polymer material dissolves in the organic solvent will typically depend upon a variety of factors including: the amount of solid polymer material and organic solvent initially present in the mixture; the solubility of the solid polymer material in the organic solvent; the dissolution temperature of the solid polymer material in the organic solvent; and the time for which the temperature of the mixture is held at or above the dissolution temperature. In a presently preferred embodiment, substantially all, more preferably all, of the solid polymer material is dissolved in the organic solvent. Preferably, the solution includes at least 10 wt-% of dissolved polymer material, based on the total weight of organic solvent and the polymer material dissolved therein.

The aforementioned heating step may be conducted at any suitable pressure and may be conducted in either an open or a closed vessel. The pressure at which the heating step is conducted will typically depend upon the boiling point of the organic solvent and the dissolution temperature of the polymeric material in the organic solvent. If for example, the boiling point of the solvent is above that of the dissolution temperature of the solid polymer material in the solvent, then the heating step may be conducted in a non-sealed vessel open to atmospheric conditions, if desired. However, if an organic solvent is selected that has a boiling point below that of the dissolution temperature of the solid polymer material in the solvent, then the heating step may need to be conducted in a suitably pressurized vessel. In certain preferred embodiments, the heating step is conducted at atmospheric pressure.

The one or more organic solvents used to dissolve the solid polymer material preferably have a boiling point greater than ambient temperature, more preferably at least 80° C., even more preferably at least 120° C., and optimally at least 150° C. In a presently preferred embodiment, the organic solvent is cyclohexanone, which has a boiling point of about 154° C. Other suitable organic solvents for use in dissolving the solid polymer material, and solid polyester materials in particular, may include and be of the following types: aliphatics, aromatics, alcohols, ethers, esters, ketones, amides, nitriles, and combinations thereof. Some examples of specific solvents include hexanes, heptanes, xylene, Aromatic 100 (CAS 64742-95-6), Aromatic 150 (CAS 64742-94-5), Aromatic 200 (CAS 68477-31-6), 2-butoxyethanol, 2-(2-ethoxyethoxy)ethanol, dibasic ester, cyclohexanone, diisobutylketone, diamylketone, N,N-dimethylformamide, acetonitrile, N-methyl-2-pyrrolidone, and mixtures thereof.

Once a sufficient amount of the material has been dissolved, the resulting solution (which may optionally include some un-dissolved polymer material) is cooled in order to precipitate out polymer particles from the solution. If desired, the temperature of the solution may optionally be held constant for any suitable period of time (e.g., 30 minutes) after the desired amount of solid polymer material has dissolved. The solution is then preferably cooled to facilitate precipitation of suitably sized polymer particles. In this regard, any suitable cooling rate may be used. In one embodiment, the heated solution is rapidly cooled to a temperature above that where precipitation occurs and is thereafter slowly cooled (e.g., at a rate of 0.1 to 1° C. cooling per minute). Agitation may optionally be used during the cool-down step. The speed of agitation will vary depending upon a variety of factors such as, for example, a blade configuration used and the desired particles size. While not intending to be bound by any theory, it is believed that a higher rate of agitation during the cool-down step can contribute to the precipitated polymer particles having a smaller particle size.

If desired, the organic solvent used to produce the precipitated polymer particles may be removed in whole or in part (e.g., via vacuum stripping, distillation, filtering, etc.) or otherwise replaced with different solvent. In some embodiments, the organic solvent (e.g., cyclohexanone) is not removed and constitutes part, or all, of the liquid carrier of a subsequent coating composition including the precipitated particles. If desired, the particles may be selectively filtered to achieve a desired particle distribution.

An additional example of a process (referred to hereinafter as "Process B") for forming suitably sized polymer particles, preferably without the use of any surfactant, is provided below. Unlike Process A, Process B utilizes a melt dispersion technique to obtain polymer particles.

Solid polyester material (e.g., polyester pellets of P1500HV) is placed into a sealed chamber along with a suitable organic solvent (e.g., an aprotic solvent such as tetrahydrofuran ("THF"), dimethyl sulfoxide ("DMSO"), dimethylformamide ("DMF"), DOWANOL PM solvent, butyl cellosolve acetate, or a mixture thereof). An example of suitable proportions of polyester and organic solvent is 5 to 20 wt-% polyester material, with the balance being THF. The vessel is sealed and the mixture is subjected to high agitation (e.g., 5,000 revolutions per minute ("rpm")) using a radial-flow impeller having a close clearance to the sidewall of the vessel (e.g., a 2 millimeter gap between the sidewall and the impeller) to produce high shear (e.g., from 500-10,000 $s^{-1}$, or about 2,750 $s^{-1}$ in one embodiment) near the vessel sidewall while the mixture is suitably heated (e.g., to about 190-200° C.). While subjected to the high agitation, the mixture is held at an elevated temperature for a suitable time period (e.g., about 190-200° C. for about 30-45 minutes), after which the mixture is slowly cooled to a suitable temperature (e.g., to 150° C.). After the initial cooling step, the mixture is then slowly cooled (preferably at low rpm) over several hours to 25° C. to yield suitably sized polyester particles. The THF may be removed (e.g., by filtration or evaporation), if desired, to yield dry polyester particles. Additionally, if desired, the resulting polyester particles/THF mixture and/or dry polyester particles may be selectively filtered to achieve a desired particle size distribution.

The aforementioned temperatures and times are provided in the context of THF and P1500HV polyester and will typically vary depending upon material selections. The above process may be configured to produce suitably sized polymer particles from polymer materials other than polyester materials.

It is contemplated that the above Processes A and B may be configured to a variety of polyester materials, as well as other types of polymers such as acrylic, polyamide, or polyurethane polymers.

While not presently preferred, in a process such as Process B described above, optional surfactants may be used to assist in production of suitably sized polymer particles. For example, a suitable amount of surfactant (e.g., 0.1 to 5 wt-%) may be included in the mixture of polymer material and solvent during the high shear blending step. Non-limiting examples of suitable surfactants may include aliphatic alcohols (e.g., hexyl cellosolve, hexyl carbitol, butyl carbitol, butyl cellosolve, Texanol, or combinations thereof).

Test Methods

Unless indicated otherwise, the following test methods were utilized in the Examples that follow.

A. Particle Size Determination

The volume-averaged particle size of particles of the invention may be determined as follows. Particle size distributions were measured on a Beckman Coulter LS 230 Laser Diffraction Particle Size Analyzer (serial number Z25784, manufactured in 1996, hereinafter the "Analyzer") which was fitted with a Small Volume Module (SVM, model SVM Plus, serial number RAH03002) and calibrated as recommended by the manufacturer. The particle dispersions of the invention were highly diluted (approximately 3 drops in 10 milliliters) in a substantially non-swelling solvent (such as cyclohexanone or 2-butoxyethanol) and shaken vigorously in a 20 milliliter vial until evenly dispersed. The choice of a suitable solvent will depend upon the particular particles to be tested. Solvent screening tests may need to be conducted to identify a suitable substantially non-swelling solvent. Cyclohexanone is a preferred substantially non-swelling solvent for certain polyester particles, including those of the Example section. By way of example, a solvent in which a polymer particle swells by about 1% or less would be considered a substantially non-swelling solvent.

The SVM cell of the Analyzer was filled with the same solvent used to dilute the sample, and the cell's integrated agitation speed was set to 50%. The Analyzer then automatically measured the offset of the detector channel voltages with no light present, aligned the laser beam to the center of the detector, and measured the background intensity of any light scattered with no sample in the SVM cell. Several drops of the diluted sample were then added to the SVM cell until the PIDS (Polarization Intensity Differential Scattering) obscuration reached 40 to 50%. Two runs (of 90-second duration each) were performed, during which time a 750 nanometer (nm) solid state laser was directed at the particles, and the diffraction patterns were measured at multiple angles (in reference to the impinging laser light). The collective signal recorded for the diffraction patterns over this period was then deconvoluted according to the Fraunhofer approximation to yield a distribution of particle sizes (this is accomplished by the operator by selecting the Fraunhofer.rfd model option in the Analyzer software). For the purpose of the present invention, unless otherwise noted, particle sizes measurements are expressed as a volume-averaged particle size or diameter (meaning that the larger volume particles are weighted more heavily in the calculation of the mean) and are the average distributions of the two runs performed for each sample. If the standard deviation of the distribution is reported, this represents the square root of the arithmetic variance. Based on manufacturer's literature, the particles sizes reported by the Analyzer are believed to correspond to the diameters of spheres having the same scattering pattern as the measured particles. It is believed that the particle size analysis of the Analyzer embodies the principles of International Standard ISO 13320:2009(E) entitled "Particle size analysis—Laser diffraction methods."

B. Adhesion Test

Adhesion testing was performed to assess whether the coating compositions adhere to the coated substrate. The Adhesion Test was performed according to ASTM D3359-Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. A coating is considered herein to satisfy the Adhesion Test if it exhibits an adhesion rating of at least 8.

C. Blush Resistance Test

Blush resistance measures the ability of a coating to resist attack by various solutions. Typically, blush is measured by the amount of water absorbed into a coated film. When the film absorbs water, it generally becomes cloudy or looks white. Blush was measured visually using a scale of 0-10 where a rating of "10" indicates no blush, a rating of "5" indicates slight whitening of the film, and a rating of "0" indicates severe whitening of the film.

D. Water Pasteurization (Also Referred to as Water Retort)

Water retort is a measure of the coating integrity of the coated substrate after exposure to heat and pressure with a liquid such as water. Water retort performance is not necessarily required for all food and beverage coatings, but is desirable for some product types that are packed under retort conditions. Testing is accomplished by subjecting the substrate to heat ranging from 105-130° C. and pressure of 15 psi (~1.05 kg/cm$^2$) for a period of 15 to 90 minutes. The coated substrate was then tested for adhesion and blush as described above.

E. Dowfax Detergent Test

The "Dowfax" test is designed to measure the resistance of a coating to a boiling detergent solution. The solution is prepared by mixing 5 ml of Dowfax 2A1 (product of Dow Chemical) into 3000 ml of deionized water. Typically, coated substrate strips are immersed into the boiling Dowfax solution for 15 minutes. The strips are then rinsed and cooled in deionized water, dried, and then tested and rated for blush and adhesion as described previously. Preferred coatings provide adhesion ratings of 10 and blush ratings of at least 4, more preferably 6 or above in the Dowfax detergent test.

F. Fabrication Test

This test measures the ability of a coated substrate to retain its integrity as it undergoes the formation process necessary to produce a fabricated article such as a beverage can end. It is a measure of the presence or absence of cracks or fractures in the formed end. The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, fully converted 202 standard opening beverage ends were exposed for a period of 4 seconds to a room-temperature electrolyte solution comprised of 1% NaCl by weight in deionized water. The coating to be evaluated was present on the interior surface of the beverage end at a dry film thickness of 6 to 7.5 milligrams per square inch ("msi") (or 9.3 to 11.6 grams per square meter), with 7 msi being the target thickness. Metal exposure was measured using a WACO Enamel Rater II (available from the Wilkens-Anderson Company, Chicago, Ill.), with an output voltage of 6.3 volts. The measured electrical current, in milliamps, is reported. End continuities are typically tested initially and then after the ends are subjected to pasteurization or retort.

Preferred coatings of the present invention initially pass less than 10 milliamps (mA) when tested as described above, more preferably less than 5 mA, most preferably less than 2 mA, and optimally less than 1 mA.

Fabrication Test data appears below in Tables 2 and 4.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Example 1: Polyester Particles Prepared in a Closed System

The general procedure employed for Example 1, Runs 1-5, is described below, and all procedural details, ingredients, and resulting particle sizes are listed in Table 1. DYNAPOL P1500HV is a high molecular weight polyester (Evonik Industries) with a glass transition temperature (Tg) of 27° C. and a melt temperature (Tm) of approximately 170° C. GRILTEX D2267EG is a high molecular weight polyester (EMS-Chemie) with a Tg of 26° C. and a Tm of 170° C., and GRILTEX D2310EG (also EMS-Chemie) is a high molecular weight polyester with a Tg of 55° C. and a Tm range of 165-175° C.

Components 1-4 (several examples had fewer than 4 components) were combined in a 1-liter, stainless steel, oil-jacketed reactor, fitted with an electric-drive agitator (consisting of two, pumping-style, 4-angled-blade impellers positioned in the upper third and the lower third of the liquid) and two observation windows. A nitrogen blanket was applied, and the agitation rate was set to 400 rpm. The vessel was then sealed and heated rapidly to 160° C. (generating approximately 20-30 psi depending on specific run). The pellets fully dissolved during the heat-up, resulting in a clear, homogeneous solution. Following a 30-minute hold at 160° C., the temperature was decreased rapidly to 100° C. (while not believed to be critical, the cool-down rate during this step was generally between −3.0 to −6.0° C. per minute), during which time no transitions or physical changes were observed. From 100° C. to 25° C., the temperature of the clear solution was decreased at a controlled rate of −0.5° C. per minute. In the range of 75 to 95° C. (depending on the specific run), the dissolved polymer began to precipitate as a fine white powder as determined by visual interpretation. Once the temperature had reached 25° C., the agitation was stopped and the vessel (now at atmospheric pressure) was opened to release any residual pressure. The resulting, thin, white dispersion was discharged.

The particle size was determined as described in the Test Methods section above and the results are reported in Table 1 below. Both volume averaged and number-averaged particle sizes are provided to give an indication of the distribution. Due to its impact on the reported particle sizes, the solvent used during the particle size analysis is also reported.

TABLE 1

Charges and Results for Example 1, Runs 1-5.

| | Component 1 Amount (wt %) | Component 2 Amount (wt %) | Component 3 Amount (wt %) | Component 4 Amount (wt %) | Particle Size Analysis Solvent | Volume-Averaged Particle Size (Std Dev) | Number-Averaged Particle Size (Std Dev) |
|---|---|---|---|---|---|---|---|
| Run 1 | DYNAPOL P1500HV 87.5 g (17.5 wt %) | Cyclohexanone 412.5 g (82.5 wt %) | — — | — — | Cyclohexanone | 9.7 μm (6.2 μm) | 2.1 μm (1.3 μm) |
| Run 2 | GRILTEX D2267EG 87.5 g (17.5 wt %) | Cyclohexanone 412.5 g (82.5 wt %) | — — | — — | Butyl Cellosolve | 13.8 μm (9.2 μm) | 2.3 μm (1.3 μm) |
| Run 3 | GRILTEX D2310EG 87.5 g (17.5 wt %) | Cyclohexanone 412.5 g (82.5 wt %) | — — | — — | Cyclohexanone | 14.9 μm (7.2 μm) | 2.3 μm (1.4 μm) |
| Run 4 | P1500HV 120.0 g (15.0 wt %) | SB Polyester 263.2 g (32.9 wt %) | Cyclohexanone 250.1 g (31.3 wt %) | Dibasic Ester 166.7 g (20.8 wt %) | Cyclohexanone | 13.7 μm (8.6 μm) | 2.6 μm (1.5 μm) |
| Run 5 | GRILTEX D2310EG | SB Polyester | Cyclohexanone | Dibasic Ester | Cyclohexanone | 19.9 μm (9.9 μm) | 1.3 μm (1.0 μm) |

Example 2: Coated Articles

The particle dispersion of Example 1, Run 1 was applied, without modification, to multiple samples of two different types of aluminum substrate (i.e., from Alcoa and Betz) and cured at three different oven temperatures (i.e., 204° C., 227° C., and 249° C.). The coating composition was applied at a dry-film thickness typical for a beverage end coating (approximately 10 to 11 grams per square meter). The resulting coated articles are referred to in Table 2 as Example 2, Runs 1-6. The cured coating samples of Examples 2, Runs 1-6 and a Control were then subjected to a variety of tests to assess their suitability for use as a food-contact coating for metal food or beverage cans. The data is provided below in Table 2. The "Control" was a commercial epoxy-acrylate beverage end coating composition that was applied to Alcoa 5182 aluminum substrate at a dry-film thickness of approximately 10 to 11 grams per square meter and cured for 1 minute in a 204° C. oven. Although not included in Table 2, the cured coating compositions of Example 2, Runs 1-6 also exhibited acceptable commercial feathering and good solvent resistance (as determined by MEK double rubs).

sisting of two "half-moon" style blades at the top and bottom of the liquid), a water condenser, and a nitrogen blanket. The agitation rate was set to 200 rpm. The vessel remained open through the condenser exit and was heated rapidly (while not considered to be critical, the heat-up rate was generally 3 to 8° C. per minute) to the reflux temperature of the solvent (component 2). The pellets fully dissolved during the heat-up, resulting in a clear, homogeneous solution. Following a 30-minute hold at reflux, the temperature was decreased rapidly (again, the rate is not considered to be critical, but was typically 3 to 6° C. per minute) to 100° C., during which time no transitions or physical changes were observed. From 100° C. to 25° C., the temperature of the clear solution was decreased at a rate of approximately −0.5° C. per minute. A controlled rate was more difficult to achieve in a glass flask, but limits of −0.1 to −1.0° C. per minute were strictly maintained. During this slow cool-down, the dissolved polymer began to precipitate as a fine white powder. Once the temperature had reached 25° C., the agitation was stopped and the product dispersion was discharged as a thin white

TABLE 2

Example 2 Testing Results

| Coated Article | Substrate Type and Oven Cure Temp | Fabrication (in milliamps)* | DI Water Process (90 minutes at 121° C.) | | Coffee Process (60 minutes immersed in 121° C. coffee)* | | |
|---|---|---|---|---|---|---|---|
| | | | Blush (W/V) | Adhesion (W/V) | Stain | Blush | Adhesion (RI/Flat) |
| Commercial Control | Alcoa 5182, 204° C. | 0.4 | 9/9 | 9/9 | 2 | 6 | 2/0 |
| Example 2, Run 1 | Alcoa 5182, 204° C. | 1.4 | 9.5/10 | 9/9 | 8 | 9 | 1/0 |
| Example 2, Run 2 | Alcoa 5182, 227° C. | 1.6 | 9.5/10 | 10/10 | 8 | 9 | 1/0 |
| Example 2, Run 3 | Alcoa 5182, 249° C. | 2.3 | 9.5/10 | 10/10 | 8 | 9 | 2/1 |
| Example 2, Run 4 | Betz 1903, 204° C. | — | 9.5/10 | 10/10 | 6 | 10 | 6/4 |
| Example 2, Run 5 | Betz 1903, 227° C. | — | 9.5/10 | 10/10 | 6 | 10 | 8/10 |
| Example 2, Run 6 | Betz 1903, 249° C. | — | 9.5/10 | 10/10 | 6 | 10 | 10/10 |

*The level of coffee staining of the coating was graded on a scale of 0 to 10, with "10" indicating no staining, "5" indicating moderate staining, and "0" indicating complete staining. Stain, blush, and adhesion were assessed for the coffee treated samples. The samples were both flat panels and reverse impacted ("RI") panels. Prior to coffee treatment, the RI panels had an anvil of a given weight dropped from a predetermined height onto the back of the coated panel to stress the coating and simulate fabrication stresses.

Example 3: Polyester Particles Prepared in an Open System

The general procedure employed for Example 3, Runs 1-4, is described below, and all procedural details, ingredients, and resulting particle sizes are listed in Table 3. DYNAPOL P1500HV is described in Example 1, and DYNAPOL P1500 is a lower molecular weight version of P1500HV having a similar Tg and Tm. Components 1 and 2 were combined in a 5-liter, round-bottom, glass flask, fitted with an electric heating mantle, electric-drive agitator (conliquid. The particle size was determined as described in the Test Methods section above and the results are reported in Table 3 below. Volume averaged and number-averaged particle sizes are provided to give an indication of the distribution. Due to its impact on the reported particle sizes, the solvent used during the particle size analysis is also reported. While coating composition and film testing are not reported for Example 3, it is conceivable that films could be prepared from the dispersions in Example 3 in an identical manner to those prepared in Examples 2 and 5.

TABLE 3

Charges and Results for Example 3, Runs 1-4

| | Component 1 Amount (wt %) | Component 2 Amount (wt %) | Particle Size Analysis Solvent | Volume-Averaged Particle Size (Std Dev) | Number-Averaged Particle Size (Std Dev) |
|---|---|---|---|---|---|
| Run 1 | DYNAPOL P1500HV 75.0 g (15.0 wt %) | Cyclohexanone 425.0 g (85.0 wt %) | Butyl Cellosolve | 13.3 µm (7.3 µm) | 2.1 µm (1.4 µm) |
| Run 2 | DYNAPOL P1500HV 50.0 g (10.0 wt %) | Dibasic ester 450.0 g (90.0 wt %) | Butyl Cellosolve | 11.6 µm (7.0 µm) | 0.86 µm (0.85 µm) |
| Run 3 | DYNAPOL P1500HV 50.0 g (10.0 wt %) | Carbitol 450.0 g (90.0 wt %) | Butyl Cellosolve | 22.3 µm (13.9 µm) | 0.14 µm (0.16 µm) |
| Run 4 | DYNAPOL P1500 75.0 g (15 wt %) | Cyclohexanone 425.0 g (85 wt %) | Butyl Cellosolve | 14.2 µm (8.5 µm) | 2.1 µm (1.4 µm) |

Example 4: Polyester Particles Formed Via "Process B"

The "Process B" previously described herein was successfully used in conjunction with DYNAPOL P1500HV polyester and THF to produce suitably sized polyester particles.

Example 5: Coating Composition Derived from Example 4

A coating composition was produced that included a film-forming amount of the resulting polyester particles, organic solvent as the liquid carrier medium (e.g., butyl cellosolve), and a crosslinking agent. The coating composition was applied to two different types of aluminum substrate and cured at two different cure temperatures (i.e., 239° C. peak metal temperature ("PMT") and 232° C. PMT). The coating composition was applied at a film thickness typical for a beverage end coating. The cured coating samples were then subjected to a variety of tests to assess their suitability for use as a food-contact coating for metal food or beverage cans. The data is provided below in Table 4, where "Ex. 5" is the inventive coating composition described above and "Control" is a commercial epoxy-acrylate beverage end coating composition.

TABLE 4

Coating Data of Example 5

|  | Alcoa 5182 Chrome Treated Aluminum | | | | Betz 1903 Treaded Aluminum | | | |
| --- | --- | --- | --- | --- | --- | --- | --- | --- |
|  | Control | Ex. 5 | Control | Ex. 5 | Control | Ex. 5 | Control | Ex. 5 |
| Postheat PMT (° C.) | 232 | 232 | 239 | 239 | 232 | 232 | 239 | 239 |
| Feathering (45 minutes at 85° C.) | 0.027 | 0.042 | 0.025 | 0.00 | 0.02 | 0.0132 | 0.014 | 0.118 |
| 90 minute at 121° C. DI Process Resistance | | | | | | | | |
| Blushing (L/V) | 8/8 | 10/10 | 8/8 | 10/10 | 7/8 | 8/8 | 8/8 | 8/8 |
| Adhesion (L/V) | 10/10 | 10/10 | 10/10 | 10/10 | 10/10 | 10/10 | 10/10 | 10/10 |
| Dowfax Pasteurization (15 minutes at 100° C.) | | | | | | | | |
| Blushing | 7 | 10 | 7 | 10 | 8 | 10 | 8 | 10 |
| Adhesion | 10 | 10 | 10 | 10 | 10 | 9 | 10 | 9 |
| Coffee Process (60 minutes at 121° C.) | | | | | | | | |
| Staining | 2 | 8 | 3 | 8 | 2 | 8 | 2 | 8 |
| Blushing | 0 | 8 | 2 | 8 | 5 | 8 | 5 | 8 |
| Adhesion | 3/0 | 0/0 | 3/0 | 0/0 | 8/8 | 9/8 | 8/8 | 9/9 |
| 202 Bev. End Fabrication (metal exposure in milliamps) | 0.1 | 2 | 0.5 | 44 | 0.1 | 66 | 0.1 | 107 |
| Rivet Failure (CuSO4) | None | None | None | None | None | None | None | None |
| Countersink Failure (CuSO4) | None | None | None | None | None | None | None | None |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method, comprising:
   providing a mixture comprising:
      a solid crystallizable thermoplastic polymer having a number average molecular weight of at least 10,000 and a melting point of at least 120° C., wherein the polymer comprises a polyester polymer, and
      an organic solvent having a boiling point of at least 120° C.;
   heating the mixture to a temperature sufficient to dissolve, but not so high as to melt, the solid thermoplastic polymer in the organic solvent; and
   cooling the mixture to form precipitated polymer particles having a volume-averaged particle size of less than 20 microns, wherein the polymer particles are suitable for use as a film-forming binder of a thermally cured interior food-contact food or beverage can coating composition, and wherein the polymer particles are (i) substantially epoxy-free and (ii) substantially free of low-molecular weight surfactant having a number average molecular weight of less than 500.

2. The method of claim 1, wherein a sufficient amount of thermoplastic polymer is dissolved so that the mixture, after heating, includes at least 10% by weight of dissolved thermoplastic polymer, based on the total weight of organic solvent and thermoplastic polymer dissolved therein.

3. The method of claim 1, wherein the precipitated polymer particles are formed without using any surfactant.

4. The method of claim 1, wherein the organic solvent comprises cyclohexanone.

5. The method of claim 1, wherein the organic solvent has a boiling point of at least 150° C.

6. The method of claim 1, wherein the precipitated polymer particles comprise polyester particles having a volume-averaged particle size of less than 10 microns.

7. The method of claim 6, wherein the polyester particles have a volume-averaged particle size of at least 1 micron.

8. The method of claim 1, wherein the polyester polymer has a melting temperature from 120 to 200° C.

9. The method of claim 1, wherein the polyester polymer comprises polyethylene terephthalate or a copolymer thereof.

10. The method of claim 1, further comprising:
combining the precipitated polymer particles with one or more additives selected from a wax, a lubricant, a crosslinker, or a pigment.

11. The method of claim 1, further comprising:
applying a coating composition including the precipitated polymer particles on a metal substrate prior to or after forming the metal substrate into a food or beverage can or portion thereof; and
thermally curing the coating composition to form an interior food-contact coating.

12. The method of claim 1, wherein the polyester polymer has a melting temperature from 120 to 180° C.

13. The method of claim 1, further comprising causing the coating composition to be used on a food or beverage can.

14. A method, comprising:
providing a mixture comprising:
a solid crystallizable thermoplastic polymer having a number average molecular weight of at least 10,000 and a melting point of at least 120° C., wherein the polymer comprises a polyester polymer, and
an organic solvent having a boiling point of at least 120° C.;
heating the mixture to a temperature sufficient to dissolve, but not so high as to melt, the solid thermoplastic polymer in the organic solvent;
cooling the mixture to form precipitated polymer particles having a volume-averaged particle size of less than 20 microns, wherein the polymer particles are suitable for use as a film-forming binder of a thermally cured interior food-contact food or beverage can coating composition, and wherein the polymer particles are (i) substantially epoxy-free and (ii) substantially free of low-molecular weight surfactant having a number average molecular weight of less than 500;
forming a liquid coating composition that includes the precipitated polyester particles; and
applying the coating composition on a metal substrate prior to or after forming the metal substrate into a food or beverage can or a portion thereof.

15. The method of claim 14, wherein a sufficient amount of thermoplastic polymer is dissolved so that the mixture, after heating, includes at least 10% by weight of dissolved thermoplastic polymer, based on the total weight of organic solvent and thermoplastic polymer dissolved therein.

16. The method of claim 14, wherein the precipitated polymer particles are formed without using any surfactant.

17. The method of claim 14, wherein the organic solvent comprises cyclohexanone.

18. The method of claim 14, wherein the organic solvent has a boiling point of at least 150° C., and wherein the polyester polymer has a melting temperature from 120 to 180° C.

19. The method of claim 14, wherein the precipitated polymer particles comprise polyester particles having a volume-averaged particle size of less than 10 microns.

20. The method of claim 19, wherein the polyester particles have a volume-averaged particle size of at least 1 micron, wherein the polyester polymer comprises polyethylene terephthalate or a copolymer thereof.

21. The method of claim 14, further comprising curing the coating composition on the metal substrate to form a cured coating having a dry film thickness from about 2 to about 10 microns.

\* \* \* \* \*